United States Patent
Yoshida

(10) Patent No.: US 9,436,587 B2
(45) Date of Patent: Sep. 6, 2016

(54) TEST CONTEXT GENERATION

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/170,217

(22) Filed: Jan. 31, 2014

(65) Prior Publication Data

US 2015/0220425 A1 Aug. 6, 2015

(51) Int. Cl.
*G06F 9/455* (2006.01)
*G06F 11/36* (2006.01)

(52) U.S. Cl.
CPC .................. *G06F 11/3684* (2013.01)

(58) Field of Classification Search
None
See application file for complete search history.

(56) References Cited

U.S. PATENT DOCUMENTS

| | | | | |
|---|---|---|---|---|
| 2012/0017119 A1* | 1/2012 | Ghosh et al. | | 714/38.1 |
| 2012/0192169 A1* | 7/2012 | Li | | G06F 11/3684 717/161 |
| 2012/0311545 A1* | 12/2012 | Li | | G06F 8/443 717/132 |
| 2013/0174258 A1* | 7/2013 | Livshits | | G06F 21/566 726/24 |
| 2014/0304685 A1* | 10/2014 | Xie | | G06F 9/455 717/124 |
| 2015/0007138 A1* | 1/2015 | Sabetta | | 717/124 |

* cited by examiner

*Primary Examiner* — Daxin Wu
(74) *Attorney, Agent, or Firm* — Maschoff Brennan

(57) ABSTRACT

A method to generate a human-friendly test context in a test proxy for a function under test may include generating an initial test context of the function under test. The method may also include enhancing a current test context with a new context enhancement. The method may also include adding a hint to the current test context. The current test context may include or be derived from the initial test context.

20 Claims, 11 Drawing Sheets

```
200
  ┌─────────────────────────────────────┐
  │ void test_n() {                     │──202
  │   global_x = 1;                     │
  │   global_y = 2;                     │
  │                                     │
  │   foo_t* foo = malloc(typeof(foo_t));│
  │   foo->a = 2;                       │
  │   foo->b = 1000;                    │
  │                                     │──204
  │   foo->x = 1;                       │
  │   int bar = 2;                      │
  │                                     │──206
  │   int retval = fut(foo, bar);       │
  │                                     │──208
  │   assert(retval == 123);            │
  │ }                                   │
  └─────────────────────────────────────┘
```

FIG. 2A

```
210
  ┌──────────────────────────────────────┐
  │ void test_n(int p1, int p2) {        │──212
  │   global_x = 1;                      │
  │   global_y = 2;                      │
  │                                      │
  │   foo_t* foo = malloc(typeof(foo_t));│
  │   foo->a = 2;                        │
  │   foo->b = 1000;                     │
  │                                      │──214
  │   foo->x = p1;                       │
  │   int bar = p2;                      │
  │                                      │──216
  │   int retval = fut(foo, bar);        │
  │                                      │──218
  │   assert(retval == p1 + p2 + 100);   │
  │ }                                    │
  └──────────────────────────────────────┘
```

FIG. 2B

```
int global;

class Example    {
    int Foo (int a[2], int i)   {
        if (a[i] != 1)
            return 1;
        if (member != 3)
            return 2;
        h = global + 1;
        if (h != 2))
            return 3;
        return 0;
    }
    void SetMember(int m)   {
        member = m;
    }
private:
    int member;
};
```

500
504
506
508
510
516
518

```
int ProxyFoo()    {
    int a[2];
    a[0] = 0;
    a[1] = 0;
    int i = 0;
    return Foo(a, i);
}
```

```
int global;
class Example   {
    int Foo (int a[2], int i)   {
        if (a[i] != 1)
            return 1;
        if (member != 3)
            return 2;
        h = global + 1;
        if (h != 2))
            return 3;
        return 0;
    }
    void SetMember(int m)   {
        member = m;
    }
private:
    int member;
};
```

500
504
506
508
510
516
518

```
int ProxyFoo(int p1, int p2, int p3)   {
    int a[2];
    a[0] = p1;
    a[1] = p2;
    int i = p3;
    ASSUME(0 <= p3 <= 1);
    return Foo(a, i);
}
```

```
int global;

class Example {
    int Foo (int a[2], int i) {
        if (a[i] != 1)            // 504
            return 1;              // 506
        if (member != 3)          // 508
            return 2;              // 510
        h = global + 1;           // 516
        if (h != 2))              // 518
            return 3;
        return 0;
    }
    void SetMember(int m) {
        member = m;
    }
    private:
        int member;
};
```
— 500

```
int ProxyFoo(int p1, int p2, int p3)  {
    int a[2];
    a[0] = p1;
    a[1] = p2;
    int i = p3;
    ASSUME(0 <= p3 <= 1);
    // Hint: Please make the following
    variable symbolic:
    // example.cc:9:9: "member"
    return Foo(a, i);
}
```
— 502C

TEST CONTEXT GENERATION

FIELD

The embodiments discussed herein are related to test context generation.

BACKGROUND

As usage of electronic devices increases, so does the number of software programs run on these devices. Typically when a software program is developed, it is verified to help assure that the software program satisfies all of the predetermined requirements for the software program. Developing test cases to determine if a software program satisfies all predetermined requirements may be difficult and time consuming.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to generate a human-friendly test context in a test proxy for a function under test may include generating an initial test context of the function under test. The method may also include enhancing a current test context with a new context enhancement. The method may also include adding a hint to the current test context. The current test context may include or be derived from the initial test context.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2A illustrates an example test case including an assertion that is manually added by a developer or other user;

FIG. 2B illustrates an example test proxy;

FIGS. 5A-5E illustrate example source code including a function under test Foo( ) and related test contexts, all arranged in accordance with at least one embodiment described herein.

DESCRIPTION OF EMBODIMENTS

Embodiments of the present invention will be explained with reference to the accompanying drawings. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
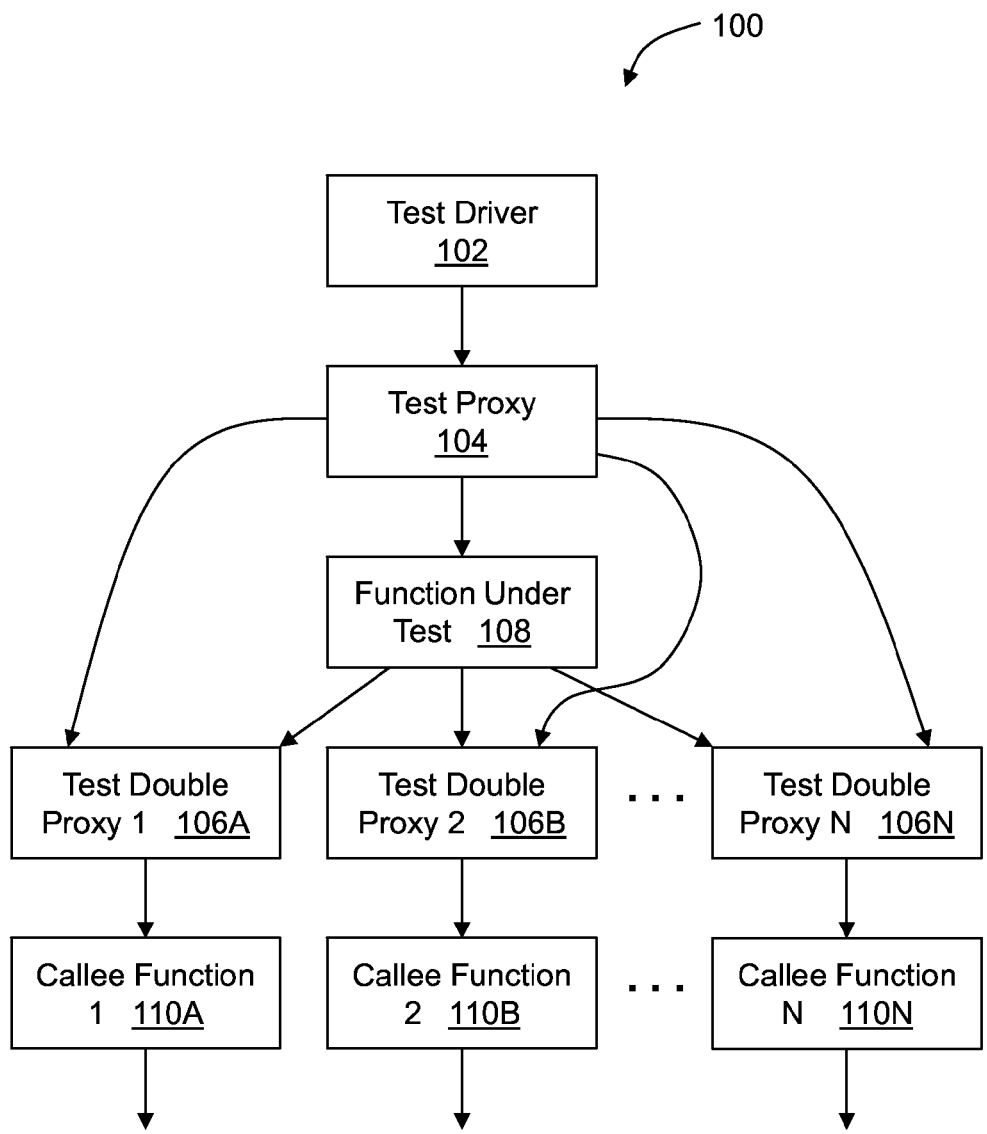
FIG. 1 illustrates an example software test tool.

FIG. 1 illustrates an example software test tool 100, arranged in accordance with at least one embodiment described herein. The software test tool 100 may include a test driver 102, a test proxy 104, and one or more test double proxies 106A-106N (collectively "test double proxies 106"). The software test tool 100 may be configured to test or verify a function under test 108.

The function under test 108 may be a function included in source code and/or a software product undergoing verification and/or other testing. The function under test 108 and/or the corresponding source code/software product may be in any of a variety of programming languages, including C++, C#, Java, or other programming languages. The function under test 108 may include function calls to one or more callee functions 110A-110N (collectively "callee functions 110").

The test driver 102 may be configured to generate multiple sets of one or more inputs, referred to as test input patterns, and to execute the function under test 108 using the test input patterns. The function under test 108 may output a result for each test input pattern. For each test input pattern, the test driver 102 may be configured to check whether the result matches an expected result. If a result matches an expected result, the test driver 102 may determine that the function under test 108 passes when executed with the corresponding test input pattern. On the other hand, if the result does not match the expected result, the test driver 102 may determine that the function under test 108 fails when executed with the corresponding test input pattern, indicating a bug or error in the source code/software product that includes the function under test 108. A user, such as a developer of the source code/software product that includes the function under test 108, may be notified of the failure and may take remedial measures to correct the bug or error.

Some software test tools verify source code/software products without using a test proxy. Such software test tools may generate multiple test input patterns, each of which may include an initialization common to all of the test input patterns, one or more test parameters specific to a corresponding one of the test input patterns, and a function call. The test input patterns may be reviewed by a developer or other user who may manually add one or more assertions, or preconditions, to each test pattern to generate multiple test cases. Manually adding assertions to test input patterns may be a tedious and time-consuming process.

FIG. 2A illustrates an example test case 200 including an assertion that is manually added by a developer or other user, arranged in accordance with at least one embodiment described herein. The test case 200 may include an initialization 202, one or more test parameters 204, a function call 206, and an assertion 208.

The initialization 202 may be common to each of multiple test cases for a function under test, fut( ), that includes two arguments, foo and bar. The initialization 202 may include various global variable assignments, memory allocation, or other initializations that may be common to each of the test cases.

The test parameters 204 may be specific to the illustrated test case 200 and different test parameters may be used in different test cases. For example, in FIG. 2A, the test parameters 204 assign a value of 1 to x—and by extension foo, where x is a member of an object pointed to by foo, and also assign a value of 2 to bar. Test parameters in other test cases 200 may assign different values to foo and bar.

The function call 206 calls fut( ) with the arguments foo and bar.

The initialization 202, the test parameters 204, and the function call 206 may be generated by a test driver as a test input pattern.

A developer or other user with knowledge regarding a product specification, e.g., knowledge regarding how fut( ) is intended to operate, may review the test input pattern and may add the assertion 208 to create the test case 200. For example, the developer may know that fut( ) is intended to return a value of 123 when the test parameters 204 are provided to fut( ), and this knowledge may be reflected in the assertion 208 added by the developer.

In operation, and using the test case 200, fut( ) may be called and provided with the test parameters 204 for the arguments foo and bar. An output of fut(foo, bar) may then be checked against the assertion 208 to determine whether fut( ) passes or fails with the test parameters 204.

As previously mentioned, manually adding assertions to multiple test input patterns to create test cases such as the test case 200 may be a tedious and time-consuming process. A single test proxy, such as the test proxy 104 of FIG. 1, may be implemented as a substitute for multiple test cases with manually-added assertions. FIG. 2B illustrates an example test proxy 210, arranged in accordance with at least one embodiment described herein. The test proxy 210 may include an initialization 212, one or more symbolic test parameters 214, a function call 216, and a symbolic assertion 218. The test proxy 210 is an example of the test proxy 104 of FIG. 1.

For the same function under test as discussed with respect to FIG. 2A, e.g., fut( ), the initialization 212 and the function call 216 of the test proxy 210 of FIG. 2B may be the same in form and function as the initialization 202 and the function call 206 of the test case 200 of FIG. 2A.

The symbolic test parameters 214 may include the test parameters 204 of FIG. 2A parameterized as symbolic variables p1 and p2. Analogously, the symbolic assertion 218 may include the assertion 208 of FIG. 2A asserted symbolically as a function of the symbolic variables p1 and p2.

The initialization 212 and the symbolic test parameters 214 may collectively form a test context for fut( ).

With combined reference to FIGS. 1 and 2B, the test driver 102 may generate multiple test input patterns that are different than test input patterns generated for testing without a test proxy. In particular, test input patterns used by software test tools without a test proxy may include an initialization, test parameters specific to the test input pattern, and a function call, such as the initialization 202, the test parameters 204, and the function call 206 of FIG. 2A. In contrast, the test input patterns generated by the test driver 102 for use with a test proxy, such as the test proxy 104 of FIG. 1 or the test proxy 210 of FIG. 2B, may omit the initialization and the function call since the initialization and the function call may be included along with symbolic test parameters in the test proxy. Instead, the test input patterns generated by the test driver 102 may include different test parameters including different specific values that may be substituted for the symbolic variables of the symbolic test parameters in the test proxy.

Aspects regarding the generation of a test proxy, such as the test proxy 104 of FIG. 1 and/or the test proxy 210 of FIG. 2B, are disclosed in U.S. patent application Ser. No. 13/828,886, filed Mar. 14, 2013, which application is herein incorporated by reference in its entirety.

Returning to FIG. 1, as previously indicated, the function under test 108 may call the callee functions 110. To better isolate the function under test 108 for testing, the software test tool 100 may include the test double proxies 106. The test double proxies 106 may include a same interface as the callee functions 110 such that the test double proxies 106 may accept the same inputs and/or provide the same outputs. More particularly, the test double proxy 106A may include a same interface as the callee function 110A, the test double proxy 106B may include a same interface as the callee function 110B, and the test double proxy 106N may include a same interface as the callee function 110N. However, the test double proxies 106 may be simpler than the callee functions 110. As an example, the callee function 110A may accept one or more inputs, may perform some complex calculations using the inputs, and may return one or more outputs based on the complex calculations. In contrast, the test double proxy 106A may accept the same inputs and may return a particular value as an output without performing any calculations, or may perform relatively simple calculations using the inputs to generate and return the output.

In some embodiments, the test double proxies 106 may serve as simple dummy functions for the callee functions 110. Alternately or additionally, the test proxy 104 may be used to specify whether the function under test 108 calls the test double proxies 106 or the callee functions 110. Additional aspects regarding the operation and generation of test double proxies, such as the test double proxies 106 of FIG. 1, are described in copending U.S. patent application Ser. No. 14/170,208, now U.S. Pat. No. 9,317,405, issued on Apr. 19, 2016, titled TEST DOUBLE GENERATION, filed concurrently herewith, which application is herein incorporated by reference in its entirety.

Embodiments described herein relate to the generation of test contexts for test proxies, such as a test context of the test proxy 104 of FIG. 1 and/or a test context of the test proxy 210 of FIG. 2B. As already mentioned in the discussion of FIG. 2B, a test context may include an initialization and one or more symbolic test parameters, such as the initialization 212 and the symbolic test parameters 214 of FIG. 2B.

The test contexts may be generated manually, semi-automatically, and/or automatically. Some embodiments described herein generate a human-friendly test context with minimal manual interventions. The test context may be made human-friendly, e.g., readable, by minimizing a number of test parameters and/or a number of initialized variables included therein. The generation of the test context may be automated to the extent possible except for any context information available to users and not implicit in the corresponding software product or particular function under test. The embodiments described herein may automatically generate a minimal initial test context and then may iteratively enhance the test context by adding initialization and parameters as described herein. In these and other embodiments, the test context may be enhanced automatically and manually in an interleaved manner.

Figure 3:
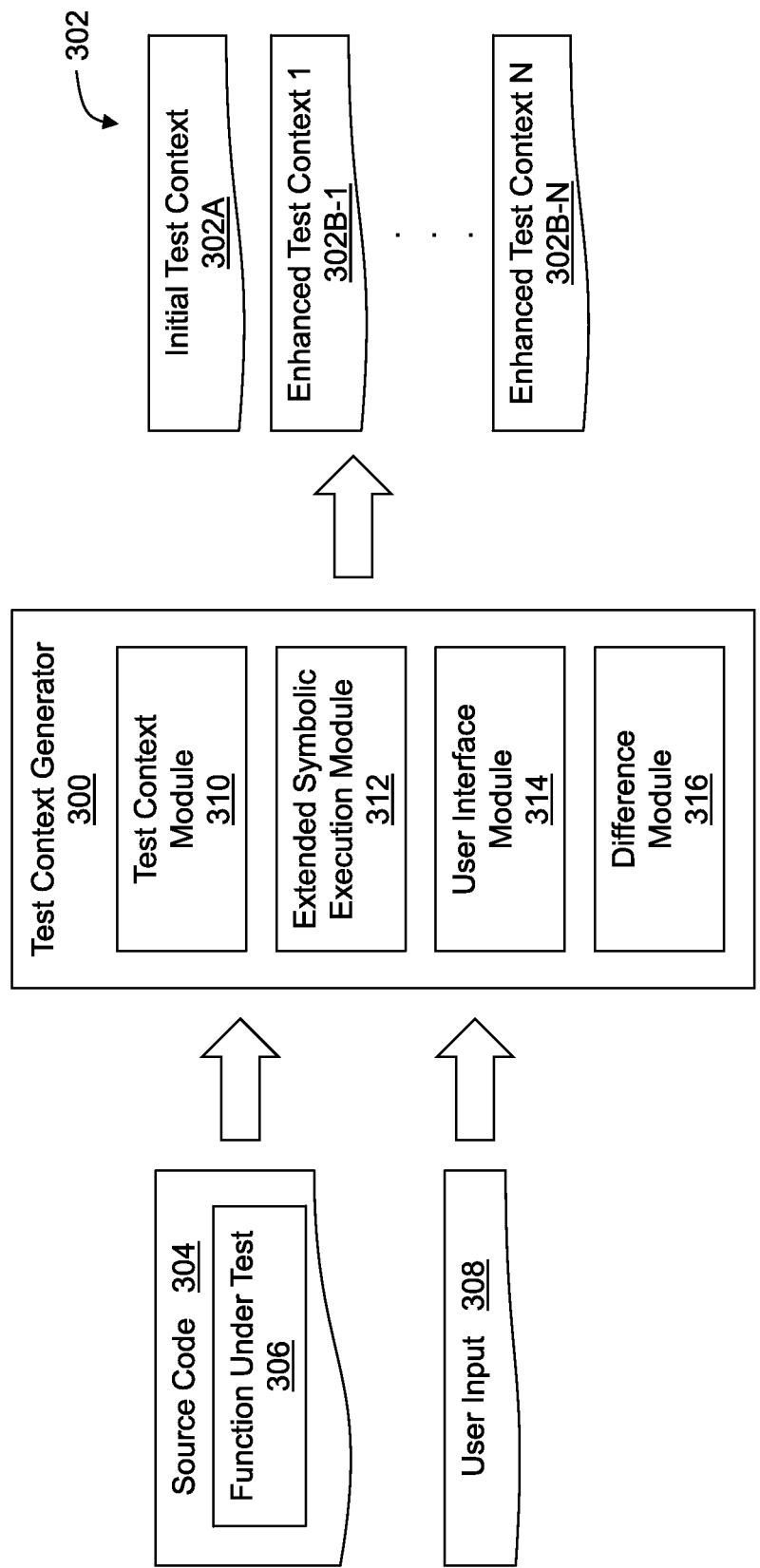
FIG. 3 is a block diagram of an example test context generator configured to generate one or more test contexts in a test proxy for a function under test.

FIG. 3 is a block diagram of an example test context generator 300 configured to generate one or more test contexts 302 in a test proxy for a function under test, arranged in accordance with at least one embodiment described herein. More particularly, the test context generator 300 may be configured to generate the test contexts 302 based on source code 304, including a function under test 306, and based on user input 308.

The function under test 306 may correspond to or include the function under test 108 of FIG. 1.

The test contexts 302 may include at least an initial test context 302A. The test contexts 302 may additionally include one or more enhanced test contexts 302B-1 to 302B-N (collectively "enhanced test contexts 302B") generated in sequence by enhancing the initial test context 302A or a preceding enhanced test context 302B. For example, a first enhanced test context 302B-1 may be generated by enhancing the initial test context 302A, a second enhanced test context (not shown) may be generated by enhancing the immediately preceding first enhanced test context 302B-1, and so on, while a last enhanced test context 302B-N may be generated by enhancing an immediately preceding second-to-last enhanced test context (not shown). The last enhanced test context 302B-N may include the most enhancements out of all of the enhanced test contexts 302B and may be included in a test proxy, such as the test proxy 104 of FIG. 1 and/or the test proxy 210 of FIG. 2B. Alternately or additionally, the initial test context 302A or another of the enhanced test contexts 302B may be included in the test proxy. The enhancements may include context enhancements that may be automatically generated, and/or manual enhancements generated in response to the user input 308.

The test context generator 300 may include a test context module 310, an extended symbolic execution module 312, a user interface module 314, and a difference module 316 (collectively "modules 310, 312, 314, and 316"). The test context generator 300 and/or one or more of the modules 310, 312, 314, and 316 may be implemented in hardware, software, or a combination thereof. For instance, the test context generator 300 and/or one or more of the modules 310, 312, 314, and 316 may be implemented in one or more application-specific integrated circuits (ASICs) and/or one or more field-programmable gate arrays (FPGAs) configured to perform the functions and operations described herein.

Alternately or additionally, the test context generator 300 including the modules 310, 312, 314, and 316 may include computer instructions executable by a processor to perform the functions and operations described herein. The computer instructions may be stored in a non-transitory computer-readable medium, examples of which are described in more detail below. Embodiments described herein may include an apparatus such as a computer that includes a processor and a non-transitory computer-readable medium such as a memory communicatively coupled to the processor. The non-transitory computer-readable medium may include stored thereon the test context generator 300 and/or one or more of the modules 310, 312, 314, and 316 that are executable by the processor to perform the functions and operations described herein. The modules 310, 312, 314, and 316 will now be described.

The test context module 310 may be configured to generate the initial test context 302A of the function under test 306. The initial test context 302A may be generated by setting function arguments of the function under test 306 equal to a constant value in the initial test context. For instance, each of the function arguments may be set to a constant value of 0 or some other constant value. All of the function arguments may be set to the same constant value, or each may be set to a different constant value, or some may be set to the same constant value while others are set to a different constant value.

The test context module 310 may also be configured to enhance a current test context with one or more context enhancements and to add one or more hints to the current test context. The current test context may include a test context that includes or is derived from the initial test context. The current test context may include the test context that is currently in existence at any given time during operation of the test context generator 300. For example, the current test context may include the initial test context 302A at a time after generation of the initial test context 302A and prior to any enhancements thereof. After enhancement of the initial test context 302A, the current test context may include the first enhanced test context 302B-1. After enhancement of a corresponding one of the enhanced test contexts 302B, the current test context may include a corresponding subsequent one of the enhanced test contexts 302B.

The context enhancements and the hints may be identified by the extended symbolic execution module 312 and may be provided to the test context module 310. The extended symbolic execution module 312 may be configured to perform extended symbolic execution of the function under test 306 using the current test context to identify the context enhancements and the hints. Aspects of extended symbolic execution are described in more detail below, including with respect to FIG. 4C.

The user interface module 314 may be configured to display the current test context including the hint identified by the extended symbolic execution module 312 and added to the current test context by the test context module 310. In some embodiments, the user interface module 314 may cause the current test context to be displayed on a monitor or other display device of a computer on which the test context generator 300 may be executed. The user interface module 314 may be further configured to receive the user input 308 that may be effective to enhance the current test context with a manual enhancement. The manual enhancement may include specification of a user-specified variable in the current test context.

The difference module 316 may be configured to identify the user-specified variable in the current test context. The user-specified variable may be identified by a textual comparison between the current test context and an immediately preceding test context to determine a textual difference between the immediately preceding test context and the current test context. The extended symbolic execution module 312 may be configured to prioritize user-specified variables so they are not overwritten by subsequent automatic enhancements to the current test context.

Figure 4A:
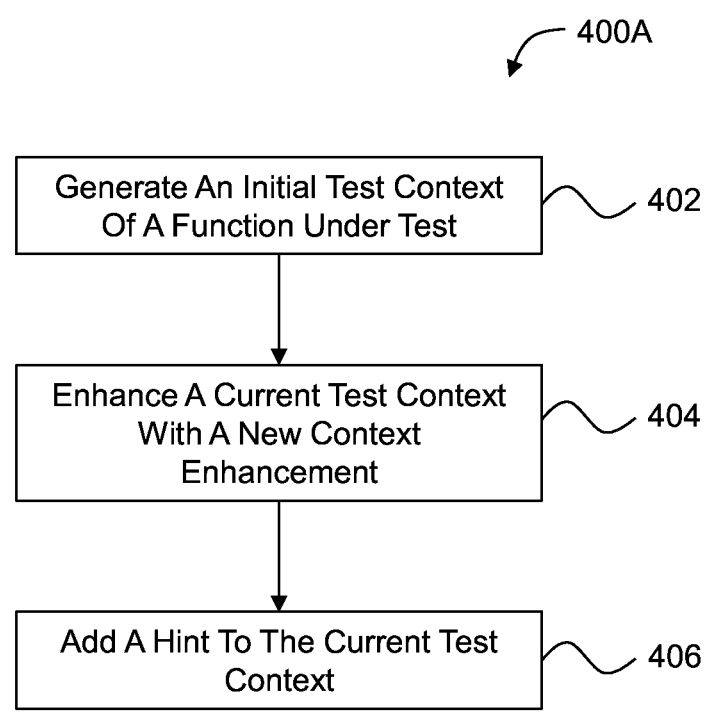
FIG. 4A is a flowchart of an example method to generate a human-friendly test context in a test proxy for a function under test.

FIG. 4A is a flowchart of an example method 400A to generate a human-friendly test context in a test proxy for a function under test, arranged in accordance with at least one embodiment described herein. The method 400A may be implemented, in some embodiments, by a computer or other apparatus, such as a computer executing the test context generator 300 of FIG. 3. Although illustrated as discrete blocks, various blocks may be divided into additional blocks, combined into fewer blocks, or eliminated, depending on the desired implementation.

The method 400A may begin at block 402 in which an initial test context of a function under test is generated. Generating the initial test context of the function under test may include setting a function argument, or multiple function arguments, of the function under test equal to a constant value in the initial test context.

At block 404, a current test context may be enhanced with a new context enhancement. The current test context may include or be derived from the initial test context. At block 406, a hint may be added to the current test context.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4B:
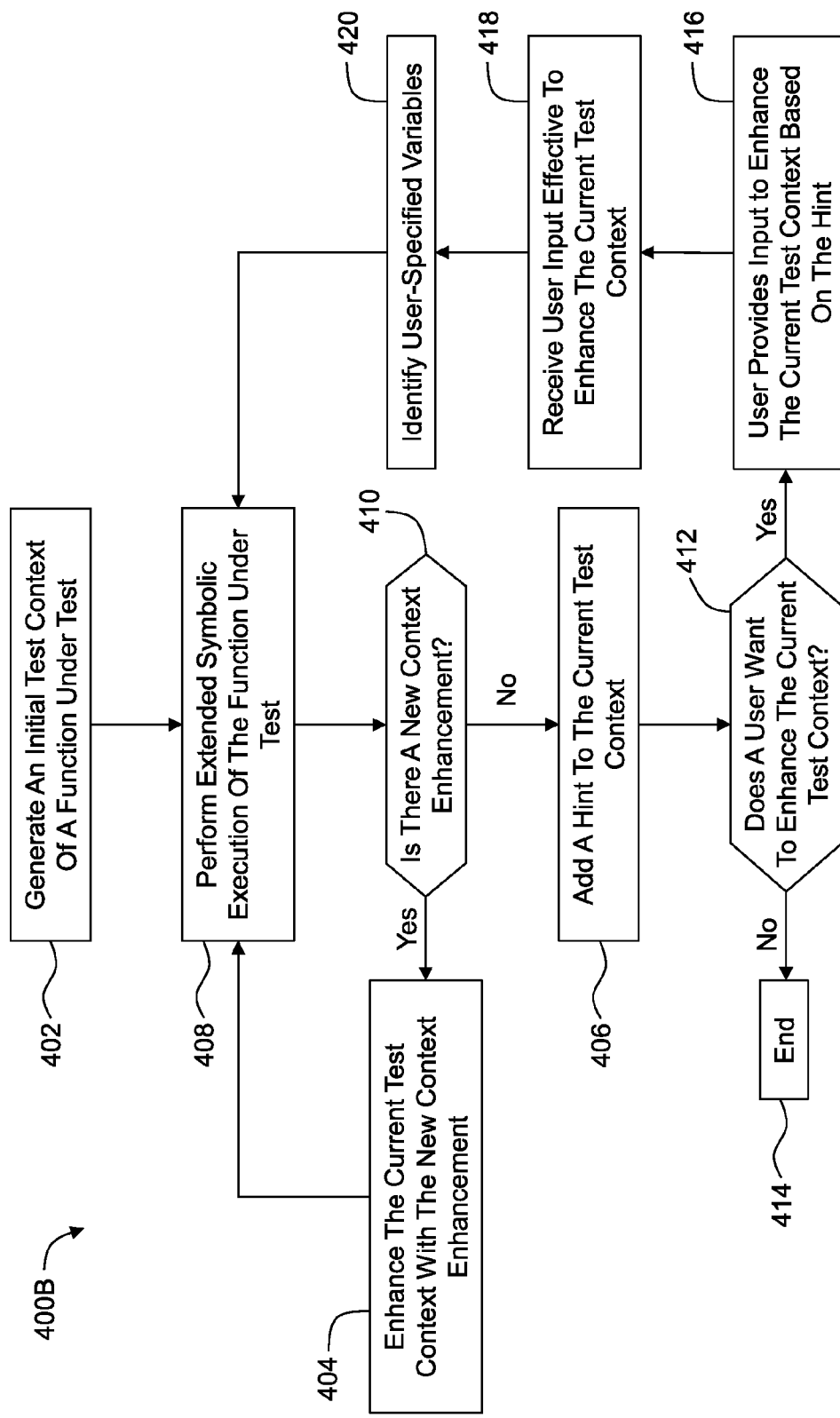
FIG. 4B is a flowchart of another example method to generate a human-friendly test context in a test proxy for a function under test.
Figure 4C:
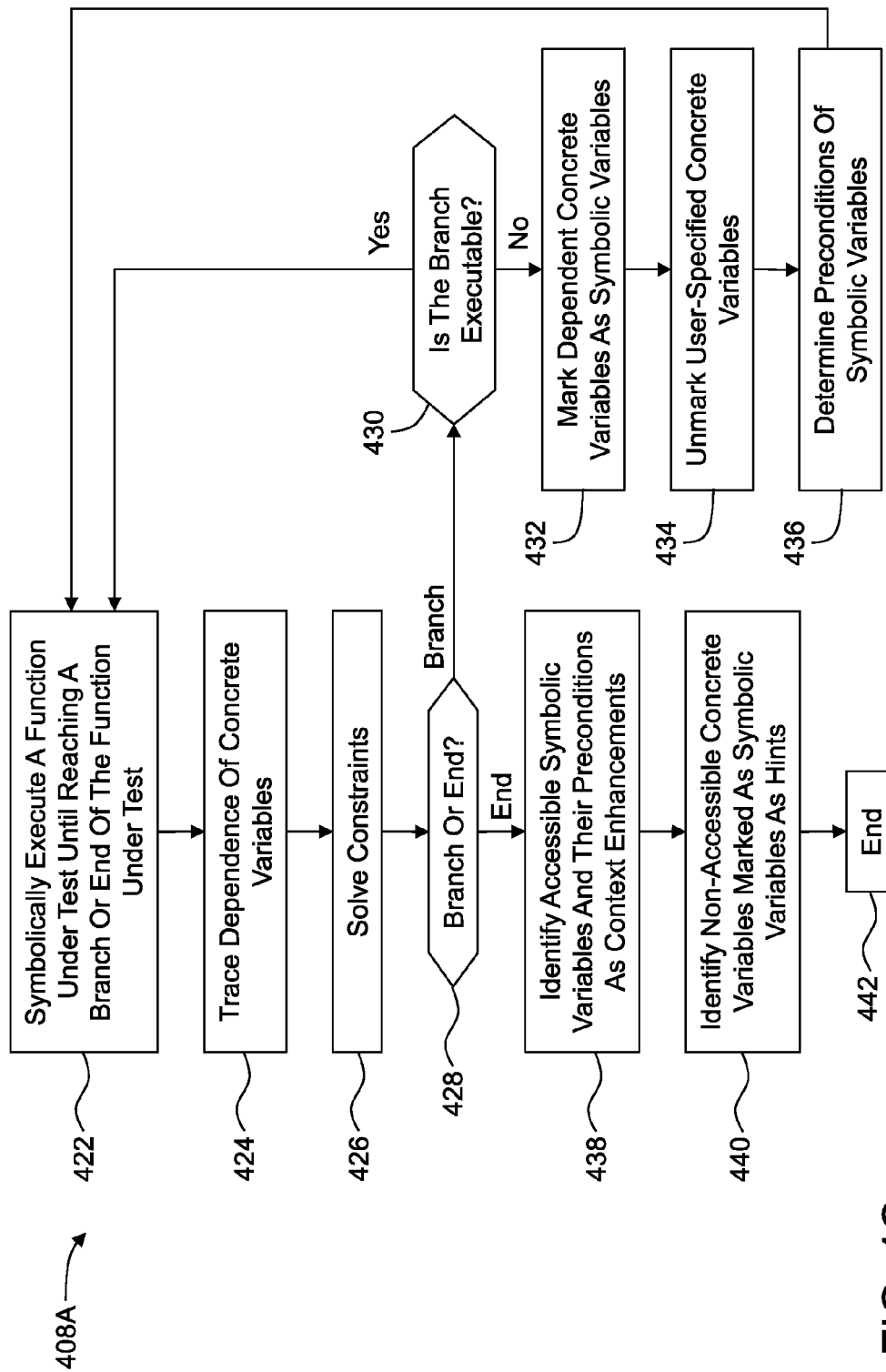
FIG. 4C is a flowchart of an example method to perform extended symbolic execution of a function under test using a current test context.

For example, the method 400A may include additional steps or operations as described in more detail with respect to FIG. 4B and/or FIG. 4C.

FIG. 4B is a flowchart of another example method 400B to generate a human-friendly test context in a test proxy for a function under test, arranged in accordance with at least one embodiment described herein. The method 400B may be implemented, in some embodiments, by a computer or other apparatus, such as a computer executing the test context generator 300 of FIG. 3. Although illustrated as discrete blocks, various blocks may be divided into additional blocks, combined into fewer blocks, or eliminated, depending on the desired implementation.

The method 400B may overlap with the method 400A of FIG. 4A. For example, the method 400B of FIG. 4B includes blocks 402, 404, and 406 of FIG. 4A, as well as various other blocks. The method 400B will now be described.

After generating the initial test context of the function under test (block 402), the method 400B may additionally include, at block 408, performing extended symbolic execution of the function under test using the current test context to identify one or more new context enhancements and one or more hints.

At block 410, the method 400B may determine whether any new context enhancements have been identified. If at least one new context enhancement is identified by the extended symbolic execution ("Yes" at block 410), the method 400B may proceed to block 404 where the current test context is enhanced with the new context enhancement. Following block 404, the method 400B may return to block 408 where extended symbolic execution of the function under test is performed again using the current test context that includes the new context enhancement identified in the preceding iteration (e.g., the immediately preceding iteration) of the extended symbolic execution.

If at least one new context enhancement is not identified in the extended symbolic execution ("No" at block 410), the method 400B may proceed to block 406 where a hint identified by the extended symbolic execution may be added to the current test context. The hint may include a suggestion for a user to modify the current test context, e.g., by making a variable symbolic in the current test context.

At block 412, the method 400B may determine whether a user wants to enhance the current test context with a manual enhancement in response to the hint. The user may include a developer of the function under test or of source code or a software product that includes the function under test. If the user does not want to enhance the current test context ("No" at block 412), the method 400B may end at block 414, and the current test context may be included in a corresponding test proxy to test the function under test.

If the user wants to enhance the current test context in response to the hint ("Yes" at block 412), at block 416, the user may provide input to enhance the current test context based on the hint. For instance, the user may provide input to implement a suggestion included in the hint. In the method 400B, blocks 412 and 416 may be performed manually by the user, whereas the other blocks may be performed automatically, e.g., by a computer.

At block 418, user input effective to enhance the current test context may be received. The user input may include specification of a user-specified variable in the current test context as symbolic or as having a constant value.

At block 420, user-specified variables may be identified in the current test context. Identifying the user-specified variables in the current test context may include determining a textual difference between an immediately preceding test context in existence prior to the specification of the user-specified variable and the current test context in existence after the specification of the user-specified variable.

Although not illustrated in FIG. 4B, the method 400B may further include prioritizing the user-specified variable such that it is not overwritten by subsequent automatic enhancements to the current test context. For example, the user-specified variable may be tagged or recorded in memory or otherwise prioritized to avoid identifying it as a new context enhancement that might otherwise be modified in the current test context.

FIG. 4C is a flowchart of an example method 408A to perform extended symbolic execution of a function under test using a current test context, arranged in accordance with at least one embodiment described herein. The method 408A may correspond to or include an example embodiment of block 408 of FIG. 4B. The method 408A may be implemented, in some embodiments, by a computer or other apparatus, such as a computer executing the test context generator 300 of FIG. 3. Although illustrated as discrete blocks, various blocks may be divided into additional blocks, combined into fewer blocks, or eliminated, depending on the desired implementation.

The method 408A may begin at block 422 in which the function under test may be symbolically executed until reaching a branch or an end of the function under test. Aspects of symbolic execution according to some embodiments are disclosed in U.S. patent application Ser. No. 13/587,423, filed Aug. 16, 2012, which application is incorporated herein by reference.

At block 424, the dependence of concrete variables may be traced. The dependence may be traced for the concrete variables included in a portion of the function under test that is symbolically executed until reaching the end or the branch. The dependence may be stored, at least temporarily, for subsequent use in the method 408A, as further described below.

At block 426, constraints may be solved of the portion of the function under test that is symbolically executed until reaching the end or the branch.

At block 428, the method 408A may determine whether the function under test has been executed until reaching the branch or the end. If the branch has been reached ("Branch" at block 428), the method 428 may proceed to block 430. If the end has been reached ("End" at block 428), the method 428 may proceed to block 438.

At block 430, the method 408A may determine whether the branch is executable. If the branch is executable ("Yes"

at block 430), the method 408A may return to block 422 where the function under test, and more particularly, the branch determined to be executable at block 430, may be symbolically executed until reaching a branch (e.g., another branch) or an end of the function under test. If the branch is not executable ("No" at block 430), the method 408A may proceed to block 432.

The determination at block 430 of whether the branch is executable may be based on the constraints and the current test context. For example, the current test context may specify a value of the concrete variable for which constraints are solved at block 426. In addition, solving the constraints of the portion of the function under test that is symbolically executed until reaching a branch at block 426 may include identifying a value or values of a concrete variable that satisfies a path condition of the branch. In these and other embodiments, the branch may be determined to not be executable based on the constraints and the current test context if it is determined that the value or values of the concrete variable that satisfies the path condition is or are unequal to the value of the concrete variable specified in the current test context, or more generally, if the value or values of the concrete variable that satisfies the path condition is or are inconsistent with the current test context. On the other hand, the branch may be determined to be executable based on the constraints and the current test context if it is determined that the value or values of the concrete variable that satisfy the path condition is or are equal to or consistent with the value of the concrete variable specified in the current test context.

At block 432, in response to determining that the branch is not executable (e.g., "No" at block 430), the method 408A may include marking dependent concrete variables as symbolic variables. Alternately or additionally, the method 408A may include determining whether the concrete variables are dependent or not dependent prior to block 432. A concrete variable may be considered dependent if the ability to execute a branch depends on the concrete variable.

At block 434, concrete variables marked as symbolic variables that are user-specified, e.g., that are user-specified variables in the current test context, may be unmarked such that they are no longer marked as symbolic variables. As described in the discussion of FIG. 4B, user-specified variables may be prioritized, e.g., by tagging or recording the user-specified variables in memory or otherwise prioritizing the user-specified variables. Thus, although not illustrated in FIG. 4C, the method 408A may include determining whether the concrete variables marked as symbolic variables at block 432 include user-specified variables prior to unmarking the marked concrete variables that include user-specified variables at block 434.

At block 436, the method may include determining one or more preconditions of some or all of the symbolic variables marked as such at block 432. Determining one or more preconditions of the symbolic variables at block 436 may include intersecting conditions of the symbolic variables. The preconditions may be determined automatically when they are implicit in the function under test. For example, if a function under test accepts as input an array a[ ] of size 2 indexed by a variable i, and i can also be used as an index to access an array of 5 elements, the conditions of i may include $0<=i<=1$ and $0<=i<=4$. The intersection of $0<=i<=1$ and $0<=i<=4$ is $0<=i<=1$, which may be determined at block 436 in the present example. From block 436, the method 408A may return to blocks 422, 424, 426, and 428.

At block 428, and as previously mentioned, the method 408A may determine whether the function under test has been executed until reaching the branch or the end. The method 408A may determine at block 428 that the function under test has been executed until reaching the end if every branch of the function under test has been executed. Alternately, the method 408A may determine at block 428 that the function under test has been executed until reaching the end if a concrete variable marked as a symbolic variable (e.g., a variable marked at block 432 that is not unmarked at block 434) is not accessible to the function under test. The accessibility of variables in general, and of the concrete variable marked as the symbolic variable in particular, may be determined based on any access modifiers that set the accessibility of the variables, or based on a corresponding default accessibility of a programming language in the absence of an explicit access modifier.

Examples of access modifiers in the C++ programming language include, in order from most restrictive to least restrictive, "private," "protected," and "public" and the default accessibility in the absence of an explicit access modifier may be the same as the "private" access modifier. An accessibility corresponding to "private" (whether set by an explicit access modifier or by default) may limit access to within the same class. The C# and Java programming languages both include the "private" access modifier with the same accessibility as in C++. Thus, if a symbolic variable (e.g., a concrete variable marked as a symbolic variable at block 432 and not unmarked at block 434) has an accessibility of "private" in any of these languages and the function under test is in a different class than the symbolic variable, the symbolic variable may be determined as not accessible to the function under test. Other access modifiers and/or default settings in C++, C#, Java, and/or other programming languages may alternately or additionally indicate that a symbolic variable is not accessible to a function under test.

At block 438, and in response to determining that a symbolic variable is accessible to the function under test, the accessible symbolic variable and/or its preconditions may be identified as a context enhancement. With combined reference to FIGS. 4A-4C, the current test context may then be enhanced with the identified context enhancement at block 404 of the methods 400A and 400B. Enhancing the current test context with the identified context enhancement may include making the corresponding concrete variable symbolic in the current test context. Alternately or additionally, enhancing the current test context with the identified context enhancement may include adding one or more preconditions of the corresponding symbolic variable (e.g., the concrete variable made symbolic in the current test context) to the current test context.

Returning to FIG. 4C, at block 440, and in response to determining that a concrete variable marked as a symbolic variable is not accessible to the function under test, the non-accessible concrete variable marked as the symbolic variable may be identified as a hint. With combined reference to FIGS. 4A-4C, the current test context may then have a hint added thereto at block 406 of the methods 400A and 400B. Adding the hint to the current test context may include adding the hint to the current test context by adding a suggestion to the current test context for a user to make the corresponding concrete variable marked as the symbolic variable symbolic in the current test context.

Returning to FIG. 4C, at block 442, the method 408A may end. The end of the method 408A at block 442 may result in a return to block 410 of the method 400B of FIG. 4B. Accordingly, some embodiments described herein include generating an initial test context for a function under test as in block 402 of FIG. 4B and iteratively enhancing the current test context with context enhancements and/or manual enhancements corresponding to hints, where the context enhancements and/or the hints are identified by performing extended symbolic execution of the function under test using the current test context.

FIGS. 5A-5E illustrate example source code 500 including a function under test Foo( ) and related test contexts 502A-502E (collectively "test contexts 502"), arranged in accordance with at least one embodiment described herein. The test contexts 502 may be generated according to the methods 400A, 400B, and/or 408A of FIGS. 4A-4C.

As illustrated in FIGS. 5A-5E, the function Foo( ) accepts function arguments including an array a[ ] of size 2 and an integer i that indexes the array a[ ]. The function Foo( ) belongs to a class Example and the source code 500 additionally defines an integer member that is outside the class Example and has an accessibility of "private." The function Foo( ) includes various branches corresponding to various "if" statements.

Each of FIGS. 5A-5E will now be described with additional reference to FIGS. 4B and 4C. The test context 502A of FIG. 5A may include an initial test context that may be generated at block 402 by setting function arguments a[0], a[1], and i each equal to a constant value of 0 in the test context 502A. Thus, the function arguments a[0], a[1], and i may be concrete variables in the test context 502A.

Extended symbolic execution may be performed at block 408 of FIG. 4B on the function Foo( ) to identify a context enhancement and/or a hint. In more detail, the function Foo( ) may be symbolically executed using the test context 502A at block 422 until reaching a first branch of the function Foo( ) at line 504 of the source code 500, which includes an if statement, if (a[i] !=1). The first branch at line 504 of the source code 500 may be followed when a path condition of the first branch is satisfied, and more particularly, when a[i] !=1 evaluates true. The first branch may additionally include the statement, return 1, at line 506 of the source code 500.

At block 424, a dependence of the concrete variables a[0], a[i], and i is traced. At block 426, constraints of the concrete variables a[0], a[1], and i are solved for the first branch. For instance, block 426 may include identifying any integer except 1 as values of a[0] and a[1] and the integers 0 and 1 as values of i that satisfy the path condition (e.g., a[i] !=1) of the first branch.

At block 428, it may be determined that the first branch (rather than an end of the function Foo( )) has been reached.

At block 430, it may be determined whether the first branch is executable based on the constraints and the current test context. For instance, it may be determined whether the constraints are permitted by, included in, or otherwise consistent with the current test context. Since the constraints for the first branch include a[0]=any integer except 1 and a[1]=any integer except 1 and since the test context 502A of FIG. 5A includes a[0]=0 and a[1]=0, it may be determined that the first branch is executable and the method 408A may return to block 422.

In a current iteration of block 422, the function Foo( ) may be symbolically executed using the test context 502A until reaching a second branch of the function Foo( ) also at line 504 of the source code 500, which includes the if statement, if (a[i] !=1). The second branch at line 504 may be followed when path conditions of the second branch are satisfied, and more particularly, when a[i] !=1 evaluates false. The second branch may additionally include the statement, if (member !=3), at line 508 of the source code 500.

In a current iteration of block 424, a dependence of the concrete variables a[0], a[i], and i is traced (or the previously traced dependence may be reused). At the current iteration of block 426, constraints of the concrete variables a[0], a[i], and i are solved for the second branch. For instance, block 426 may include identifying the integer 1 as values of a[0] and a[1] and the integers 0 and 1 as values of i that satisfy the path condition (e.g., a[i] !=1 is false) of the second branch.

In a current iteration of block 428, it may be determined that the second branch (rather than an end of the function Foo( ) has been reached.

In a current iteration of block 430, it may be determined whether the second branch is executable based on the constraints and the current test context. Since the constraints for the second branch include a[0]=1 and a[1]=1, which values are inconsistent with the statements a[0]=0 and a[1]=0 in the test context 502A of FIG. 5A, it may be determined that the second branch is not executable and the method 408A may proceed to block 432.

At block 432, the concrete variables a[0], a[1], and i may be marked as symbolic variables in response to determining that the second branch is not executable and in response to determining that the concrete variables a[0], a[1], and i are dependent concrete variables. The concrete variables a[0], a[1], and i may be determined to be dependent concrete variables based on the dependence tracing at block 424.

Since the concrete variables a[0], a[1], and i marked as symbolic variables are not user-specified concrete variables, block 434 may be skipped.

At block 436, preconditions of the symbolic variables (e.g., the concrete variables a[0], a[1], and i marked as symbolic variables) may be determined, including determining that the concrete variable i marked as the symbolic variable is an integer in a range from 0 to 1, inclusive. From this point, the method 408A may be executed at least until the concrete variables a[0], a[1], and i marked as the symbolic variables and their preconditions (e.g., 0<=i<=1) are identified at block 438 as new context enhancements if they are accessible. The test context 502A of FIG. 5A may then be enhanced at block 404 of FIG. 4B with the new context enhancements by making each of the concrete variables a[0], a[1], and i symbolic in and adding the preconditions to the current test context, as illustrated in the test context 502B of FIG. 5B.

Alternately or additionally, after determining the preconditions of the symbolic variables at block 436, the method 408A may return to block 422.

In a current iteration of block 422, the function Foo( ) may be executed using the test context 502A (or 502B) until reaching a third branch of the function Foo( ) at line 508 of the source code 500, which includes the if statement, if (member !=3). The third branch at line 508 may be followed when path conditions of the third branch are satisfied, and more particularly, when member !=3 evaluates true. The third branch may additionally include the statement, return 2, at line 510 of the source code 500.

In a current iteration of block 424, a dependence of the concrete variable member is traced. At a current iteration of block 426, a constraint of the concrete variable member is solved for the third branch. For instance, block 426 may include identifying any integer except 3 as a value of the concrete variable member that satisfies the path condition (e.g., member !=3) of the third branch.

In a current iteration of block 428, it may be determined that the third branch (rather than an end of the function Foo( )) has been reached.

In a current iteration of block 430, it may be determined whether the third branch is executable based on the constraints and the current test context. Since the constraints for the third branch include any integer except 3 for the concrete variable member, and since the test context 502A (or 502B) is silent with respect to the concrete variable member, it may be determined that the third branch is not executable and the method 408A may proceed to block 432.

In a current iteration of block 432, the concrete variable member may be marked as a symbolic variable in response to determining that the third branch is not executable and in response to determining that the concrete variable member is a dependent concrete variable.

Since the concrete variable member marked as the symbolic variable is not a user-specified concrete variable and does not have any preconditions, blocks 434 and 436 may be skipped and the method 408A may return to blocks 422, 424, 426, and 428.

In a current iteration of block 428, it may be determined that an end of the source code 500 has been reached since the concrete variable member marked as the symbolic variable is not accessible to the function Foo( ) in view of the "private" accessibility of the concrete variable member outside of the class Example that includes the function Foo( ))

Block 438 may be executed as described above to identify the concrete variables a[0], a[1], and i marked as the symbolic variables and their preconditions as new context enhancements if they are accessible, or block 438 may be skipped if already performed.

At block 440, the concrete variable member marked as the symbolic variable may be identified as a hint since it is non-accessible to the function Foo( ). The hint may then be added to the test context 502A of FIG. 5A (or the test context 502B of FIG. 5B) at block 406 of FIG. 4B by adding a suggestion for a user to make the concrete variable member marked as the symbolic variable symbolic, as illustrated at lines 512 of the test context 502C of FIG. 5C.

Figure 5D:
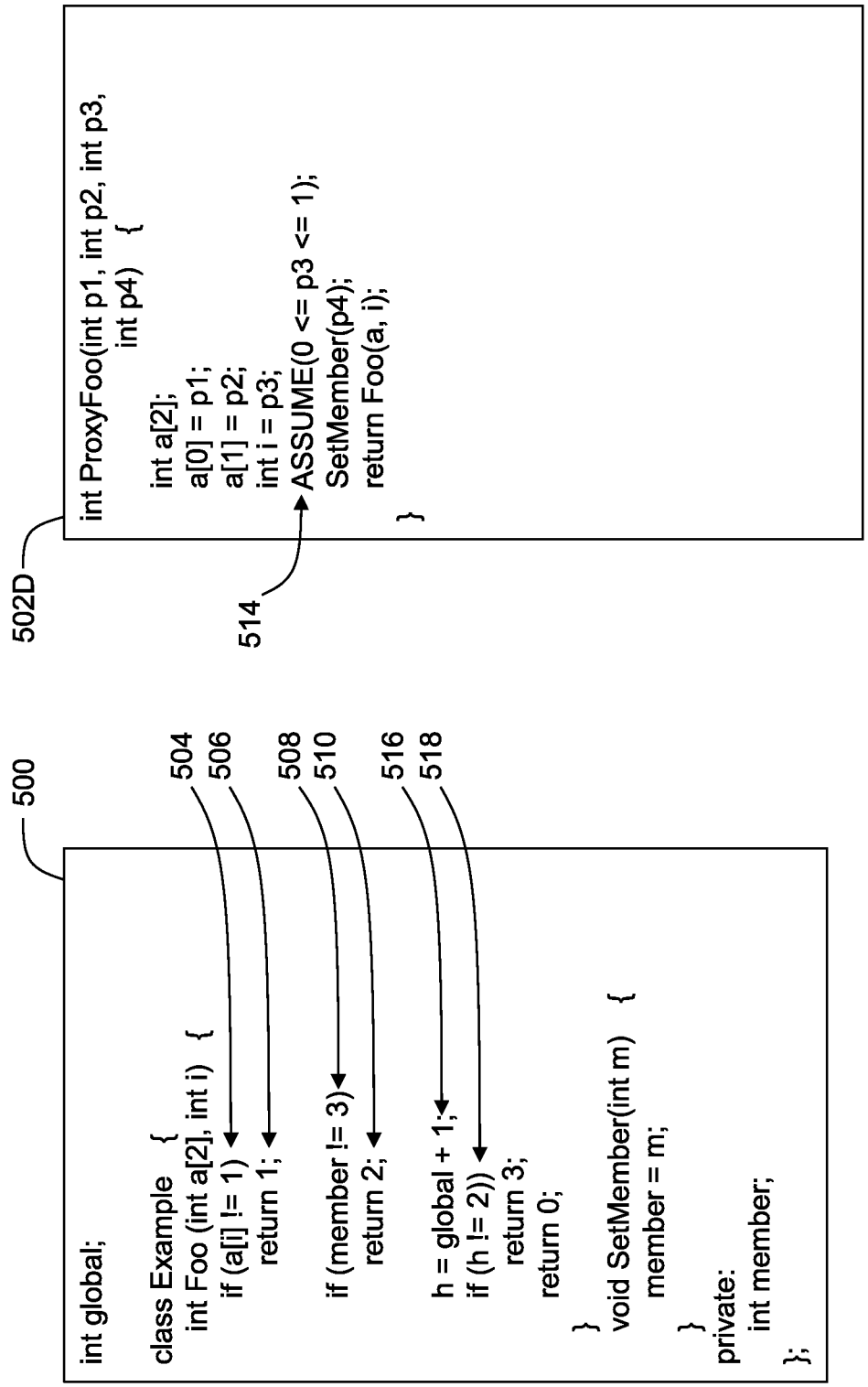
Figure 5E:
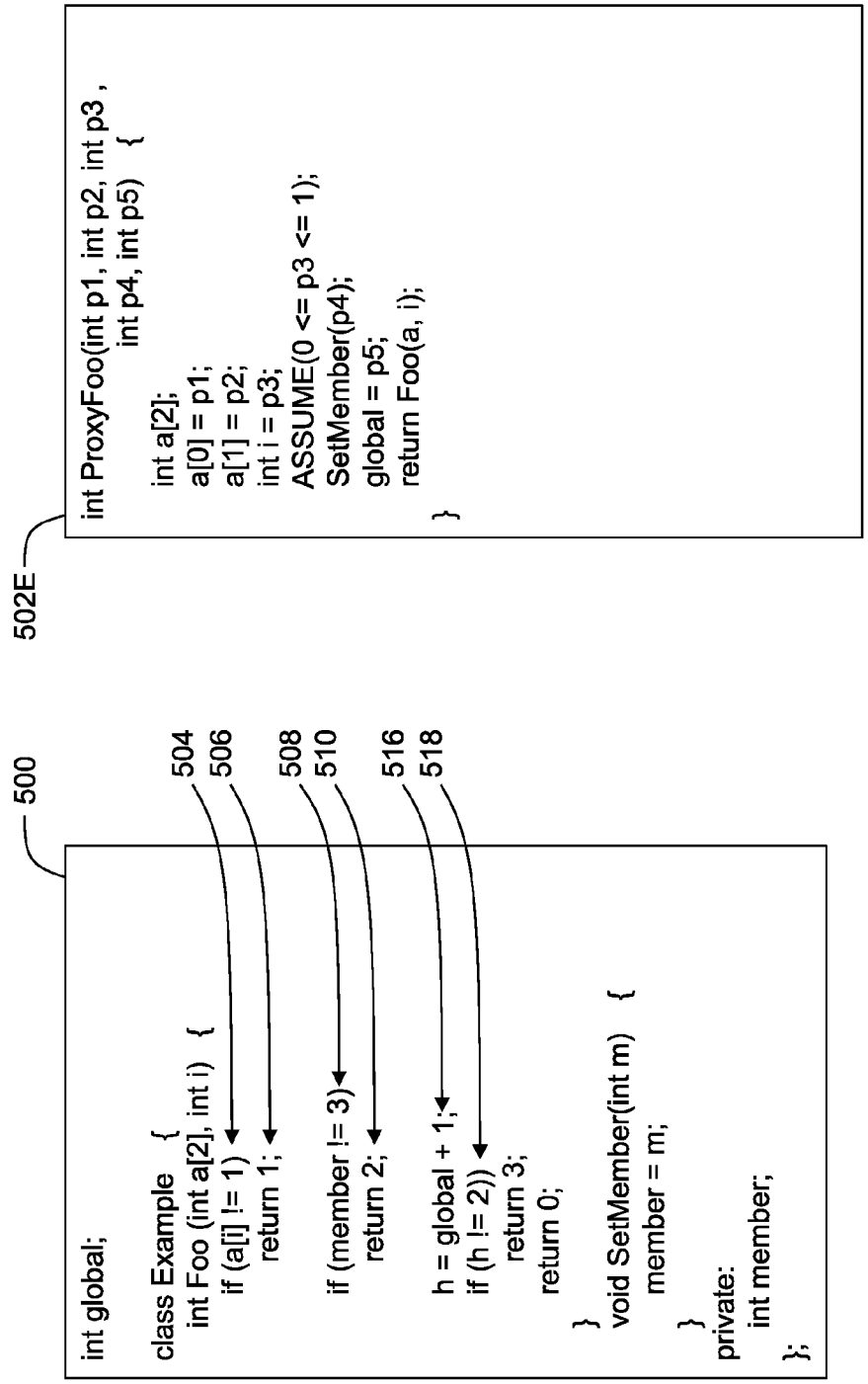

At block 412 of FIG. 4B, the user may determine whether to enhance the test context 502C of FIG. 5C based on the hint at lines 512. At block 416 of FIG. 4B, the user may provide input to enhance the test context 502C of FIG. 5C based on the hint. At block 418, user input effective to enhance the test context 502C may be received, resulting in the test context 502D of FIG. 5D including a user-specified variable at line 514. In particular, the test context 502C has been enhanced by replacing the hint at lines 512 of the test context 502C with a statement at line 514 of the test context 502D that makes an integer m, and thus the concrete variable member, symbolic.

At block 420 of FIG. 4B, the user-specified variable of the test context 502D of FIG. 5D may be identified, e.g., by determining a textual difference between the test context 502D of FIG. 5D and the test context 502C of FIG. 5C, and the method 400B of FIG. 4B may return to block 408, or more particularly to block 422 of the method 408A of FIG. 4C.

In a current iteration of block 422, the function Foo( ) may be executed using the test context 502D of FIG. 5D until reaching a fourth branch of the function Foo( ) also at line 508 of the source code 500, which includes the if statement, if (member !=3). The fourth branch at line 508 may be followed when path conditions of the fourth branch are satisfied, and more particularly, when member !=3 evaluates false. The fourth branch may additionally include the statement, h=global+1, at line 516 of the source code 500 and the statement, if (h !=2), at line 518 of the source code 500.

With member as a symbolic variable in the test context 502D, the method 408A may proceed through blocks 424, 426, 428, and 430 back to block 422.

In a current iteration of block 422, the function Foo( ) may be executed further using the test context 502D of FIG. 5D until reaching a fifth branch of the function Foo( ) at line 518 of the source code 500, which includes the if statement if (h !=2). The fifth branch at line 518 may be followed when path conditions of the fifth branch are satisfied, and more particularly, when h !=2 evaluates true.

In a current iteration of block 424, a dependence of the concrete variable h is traced to determine that h depends on a concrete variable global that is not specified in the test context 502D. Constraints of h and global are solved at block 426, it is determined at block 428 that the fifth branch has been reached, and at block 430 that the fifth branch is not executable based on the constraints and the test context 502D. The concrete variable global is determined to be dependent for the fifth branch, and the concrete variable global is marked as a symbolic variable at block 432. Blocks 434 and 436 may be skipped since the concrete variable global marked as the symbolic variable is not user-specified and does not include any preconditions. From this point, the method 408A may be executed at least until the concrete variable global marked as the symbolic variable is identified at block 438 as a new context enhancement if it is accessible, which it is in the illustrated embodiment. The test context 502D of FIG. 5D may then be enhanced at block 404 of FIG. 4B with the new context enhancement by making the concrete variable global marked as the symbolic variable symbolic, as illustrated in the test context 502E of FIG. 5E. The method 400B of FIG. 4B and/or the method 408A of FIG. 4C may continue through the rest of the function Foo( ) and/or until terminating at block 414 and/or 442.

The example of FIGS. 5A-5E illustrates how a test context for a test proxy may be generated through an iterative process of automatic context enhancements interleaved with manual enhancements made in response to automatically-generated hints. Such test contexts may thereby be generated more quickly and/or with less effort than where the test context is generated entirely or predominately in a manual manner.

The embodiments described herein may include the use of a special purpose or general purpose computer including various computer hardware or software modules, as discussed in greater detail below.

Embodiments described herein may be implemented using computer-readable media for carrying or having computer instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other storage medium which may be used to carry or store desired program code in the form of computer instructions or data structures and which may be accessed by a general purpose or special purpose computer. Combinations of the above may also be included within the scope of computer-readable media.

Computer instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method to generate a human-friendly test context in a test proxy for a function under test, the method comprising:
   generating an initial test context of the function under test;
   enhancing a current test context with a new context enhancement;
   adding a hint to the current test context; and
   performing extended symbolic execution of the function under test using the current test context to identify the new context enhancement, the extended symbolic execution including:
      determining whether a concrete variable included in a portion of the function under test is a dependent concrete variable based on whether an ability to execute a branch of the function under test depends on the concrete variable;
      further determining the branch is not executable;
      in response to determining that the concrete variable is the dependent concrete variable and to determining that the branch of the function under test is not executable, marking the concrete variable as a symbolic variable;
      determining whether the marked symbolic variable is accessible to the function under test; and
      in response to determining that the symbolic variable is accessible to the function under test, identifying the symbolic variable as the new context enhancement,
   wherein the current test context includes or is derived from the initial test context.

2. The method of claim 1, further comprising performing the extended symbolic execution of the function under test using the current test context to identify the hint.

3. The method of claim 1, wherein performing the extended symbolic execution of the function under test using the current test context comprises:
   symbolically executing the function under test until reaching the branch of the function under test;
   tracing a dependence of a concrete variable included in a portion of the function under test that is symbolically executed until reaching the branch; and
   solving constraints of the portion of the function under test that is symbolically executed until reaching the branch,
   wherein enhancing the current test context with the new context enhancement comprises making the concrete variable symbolic in the current test context, and
   wherein determining that the branch is not executable is based on the constraints and the current test context.

4. The method of claim 3, wherein:
   solving constraints of the portion of the function under test that is symbolically executed until reaching the branch includes identifying a value of the concrete variable that satisfies a path condition of the branch; and
   determining that the branch is not executable based on the constraints and the current test context comprises determining that the value of the concrete variable that satisfies the path condition is unequal to or inconsistent with a value of the concrete variable specified in the current test context.

5. The method of claim 3, wherein:
   performing the extended symbolic execution of the function under test using the current test context further comprises determining one or more preconditions of the symbolic variable; and
   enhancing the current test context with the new context enhancement further comprises adding the one or more preconditions of the symbolic variable to the current test context.

6. The method of claim 3, further comprising:
   performing the extended symbolic execution of the function under test using the current test context to identify the hint,
   wherein performing the extended symbolic execution of the function under test using the current test context further comprises, in response to determining that the concrete variable marked as the symbolic variable is not accessible to the function under test, identifying the concrete variable marked as the symbolic variable as the hint; and
   adding the hint to the current test context comprises adding a suggestion to the current test context for a user to make the concrete variable marked as the symbolic variable symbolic in the current test context.

7. The method of claim 3, wherein performing the extended symbolic execution of the function under test using the current test context further comprises, in response to determining that the concrete variable marked as the symbolic variable includes a user-specified variable in the current test context, unmarking the concrete variable marked as the symbolic variable such that it is not marked as the symbolic variable.

8. The method of claim 1, wherein the hint comprises a suggestion for a user to modify the current test context, the method further comprising:
   receiving user input effective to enhance the current test context by specification of a user-specified variable in the current test context;
   identifying the user-specified variable in the current test context; and
   prioritizing the user-specified variable such that it is not overwritten by subsequent automatic enhancements to the current test context.

9. The method of claim 8, wherein identifying the user-specified variable in the current test context comprises determining a textual difference between an immediately preceding test context in existence prior to the specification of the user-specified variable and the current test context in existence after the specification of the user-specified variable.

10. The method of claim 1, wherein generating the initial test context of the function under test comprises setting a function argument of the function under test equal to a constant value in the initial test context.

11. An apparatus comprising:
one or more processors; and
a non-transitory computer-readable medium communicatively coupled to the processors and having stored thereon computer instructions comprising a test context module executable by the processor to:
generate an initial test context of a function under test;
enhance a current test context with a new context enhancement;
mark a concrete variable included in a portion of the function under test that is symbolically executed as a symbolic variable;
determine whether the symbolic variable is accessible to the function under test; and
in response to determining that the symbolic variable is accessible to the function under test, identify the symbolic variable as the new context enhancement, and
add a hint to the current test context, wherein the hint comprises a suggestion for a user to make the concrete variable marked as the symbolic variable symbolic in the current test context,
wherein the current test context includes or is derived from the initial test context.

12. The apparatus of claim 11, wherein:
the computer instructions further comprise an extended symbolic execution module executable by the processor to perform extended symbolic execution of the function under test using the current test context to identify the new context enhancement and the hint; and
the extended symbolic execution module is executable by the processor to perform extended symbolic execution of the function under test using the current test context by being executable by the processor to:
symbolically execute the function under test until reaching a branch of the function under test;
trace a dependence of a concrete variable included in a portion of the function under test that is symbolically executed until reaching the branch;
solve constraints of the portion of the function under test that is symbolically executed until reaching the branch;
determine that the branch is not executable based on the constraints and the current test context; and
wherein the test context module is executable by the processor to enhance the current test context with the new context enhancement by being executable by the processor to make the concrete variable symbolic in the current test context, and
wherein the test context module is executable by the processor to mark the concrete variable as the symbolic variable in response to the determination that the branch cannot be executed and a determination that the concrete variable is a dependent concrete variable.

13. The apparatus of claim 11, wherein:
the computer instructions further comprise a user-interface module executable by the processor to:
display the current test context including the hint; and
receive user input effective to enhance the current test context by specification of a user-specified variable in the current test context;
the computer instructions further comprise a difference module executable by the processor to identify the user-specified variable in the current test context; and
the computer instructions further comprise an extended symbolic execution module executable by the processor to prioritize the user-specified variable such that it is not overwritten by subsequent automatic enhancements to the current test context.

14. The apparatus of claim 13, wherein the difference module is executable by the processor to identify the user-specified variable in the current test context by being executable by the processor to determine a textual difference between an immediately preceding test context in existence prior to the specification of the user-specified variable and the current test context in existence after the specification of the user-specified variable.

15. The apparatus of claim 11, wherein the test context module is executable by the processor to generate the initial test context of the function under test by being executable by the processor to set a function argument of the function under test equal to a constant value in the initial test context.

16. A non-transitory computer-readable medium having computer instructions stored thereon that are executable by a processor to perform operations comprising:
generating an initial test context of a function under test;
enhancing a current test context with a new context enhancement; and
adding a hint to the current test context; and
performing extended symbolic execution of the function under test using the current test context to identify the new context enhancement, the extended symbolic execution including:
determining whether a concrete variable included in a portion of the function under test is a dependent concrete variable based on whether an ability to execute a branch of the function under test depends on the concrete variable;
further determining the branch is not executable;
in response to determining that the concrete variable is the dependent concrete variable and to determining that the branch of the function under test is not executable, marking the concrete variable as a symbolic variable;
determining whether the marked symbolic variable is accessible to the function under test; and
in response to determining that the symbolic variable is accessible to the function under test, identifying the symbolic variable as the new context enhancement,
wherein the current test context includes or is derived from the initial test context.

17. The non-transitory computer-readable medium of claim 16, wherein performing the extended symbolic execution of the function under test using the current test context includes:
symbolically executing the function under test until reaching a branch of the function under test;
tracing a dependence of a concrete variable included in a portion of the function under test that is symbolically executed until reaching the branch; and solving constraints of the portion of the function under test that is symbolically executed until reaching the branch, wherein enhancing the current test context with the new context enhancement comprises making the concrete variable symbolic in the current test context, and wherein determining that the branch is not executable is based on the constraints and the current test context.

18. The non-transitory computer-readable medium of claim 16, wherein the hint comprises a suggestion for a user to modify the current test context, the operations further comprising:

receiving user input effective to enhance the current test context by specification of a user-specified variable in the current test context;

identifying the user-specified variable in the current test context; and prioritizing the user-specified variable such that it is not overwritten by subsequent automatic enhancements to the current test context.

19. The non-transitory computer-readable medium of claim 18, wherein identifying the user-specified variable in the current test context comprises determining a textual difference between an immediately preceding test context in existence prior to the specification of the user-specified variable and the current test context in existence after the specification of the user-specified variable.

20. The non-transitory computer-readable medium of claim 16, wherein generating the initial test context of the function under test comprises setting a function argument of the function under test equal to a constant value in the initial test context.

* * * * *